United States Patent
Armato

(10) Patent No.: US 8,788,199 B2
(45) Date of Patent: *Jul. 22, 2014

(54) TRANSPORT USING GEOLOCATION

(75) Inventor: Steven S. Armato, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/599,898

(22) Filed: Aug. 30, 2012

(65) Prior Publication Data

US 2014/0067709 A1 Mar. 6, 2014

(51) Int. Cl.
*G01C 21/12* (2006.01)
*H04W 4/22* (2009.01)
*H04W 64/00* (2009.01)
*H04W 76/00* (2009.01)
*H04L 12/54* (2013.01)
*H04L 12/56* (2006.01)

(52) U.S. Cl.
CPC .......... *H04W 4/22* (2013.01); *H04W 64/00* (2013.01); *H04W 76/007* (2013.01); *H04L 12/5695* (2013.01); *H04L 45/02* (2013.01)
USPC ........... 701/455; 701/468; 455/410; 455/453; 455/456.3; 455/456.6; 342/357.64

(58) Field of Classification Search
CPC ..... H04W 4/22; H04W 64/00; H04W 76/007; H04L 12/5695; H04L 45/02
USPC ................. 701/445, 468; 379/216.01, 91.01; 370/400, 401, 412, 447, 462; 709/238, 709/224, 245; 719/316; 455/410, 453, 455/404.1, 453.3, 453.6; 375/222; 380/277; 710/22, 26; 711/219; 73/514.31; 342/357.52

See application file for complete search history.

(56) References Cited

U.S. PATENT DOCUMENTS

| | | | | |
|---|---|---|---|---|
| 6,937,865 | B1 * | 8/2005 | Bloebaum et al. | 455/456.1 |
| 7,623,870 | B2 * | 11/2009 | Shyy et al. | 455/453 |
| 2012/0046960 | A1 * | 2/2012 | Salta | 705/1.1 |
| 2012/0136873 | A1 * | 5/2012 | Shaffer et al. | 707/741 |
| 2013/0031033 | A1 * | 1/2013 | Prieditis | 706/12 |

OTHER PUBLICATIONS

PCT Notification of Transmittal of the International Search Report and the Written Opinion of the International Searching Authority, or the Declaration; International Application No. PCT/US2013/056716, Mar. 18, 2014.

* cited by examiner

*Primary Examiner* — McDieunel Marc
(74) *Attorney, Agent, or Firm* — Baker Botts L.L.P.

(57) ABSTRACT

A system comprises a delivery application executing on a processor of a delivery device. The application communicates a message indicating a problem associated with locating a destination site for a user. The system further comprises a user application executing on a processor of a user device. The user application communicates a message confirming that the user device is located at the destination site, and communicates geocoordinates of the destination site. The system further comprises a vendor server communicatively coupled to the processor of the delivery device and the processor of the user device. The vendor server communicates with the user application to receive the geocoordinates of the destination site. The vendor server further communicates the geocoordinates of the destination site to the delivery application.

20 Claims, 7 Drawing Sheets

TRANSPORT USING GEOLOCATION

BACKGROUND

When couriers experience difficulties locating a destination site, packages remain undelivered. The undelivered packages are returned to the sender, and the sender often absorbs the cost of any subsequent delivery attempts. Furthermore, vendors often are asked to send packages to addresses that are difficult to locate. However, the vendor may not know, prior to receiving a returned package, that the address is difficult to locate.

BRIEF DESCRIPTION OF DRAWINGS

For a more complete understanding of the present disclosure and its features and advantages, reference is now made to the following description, taken in conjunction with the accompanying drawings, in which.

DETAILED DESCRIPTION

This disclosure describes a system for gathering and sending geocoordinates. These geocoordinates can be used by couriers and delivery people to help locate addresses to which deliveries are made. When a deliverer is having problems locating the address, the deliverer can send the address to the system. The system can then check to see if a recipient of the delivery is at the address. If so, the recipient can use a device such as a cell phone to send the system the geocoordinates for the address. The system can then send the geocoordinates to the deliverer to help the deliverer locate the address.

Sometimes, the recipient for the delivery is not at the address. In those instances, the system may approximate the geocoordinates of the address based on the stored geocoordinates of nearby locations. The system may examine its stored locations and determine which locations are near the address. Then, the system can use the geocoordinates of these nearby locations to approximate the geocoordinates of the address. The system can then communicate the approximate geocoordinates to the deliverer to help the deliverer locate the address.

Figure 1:
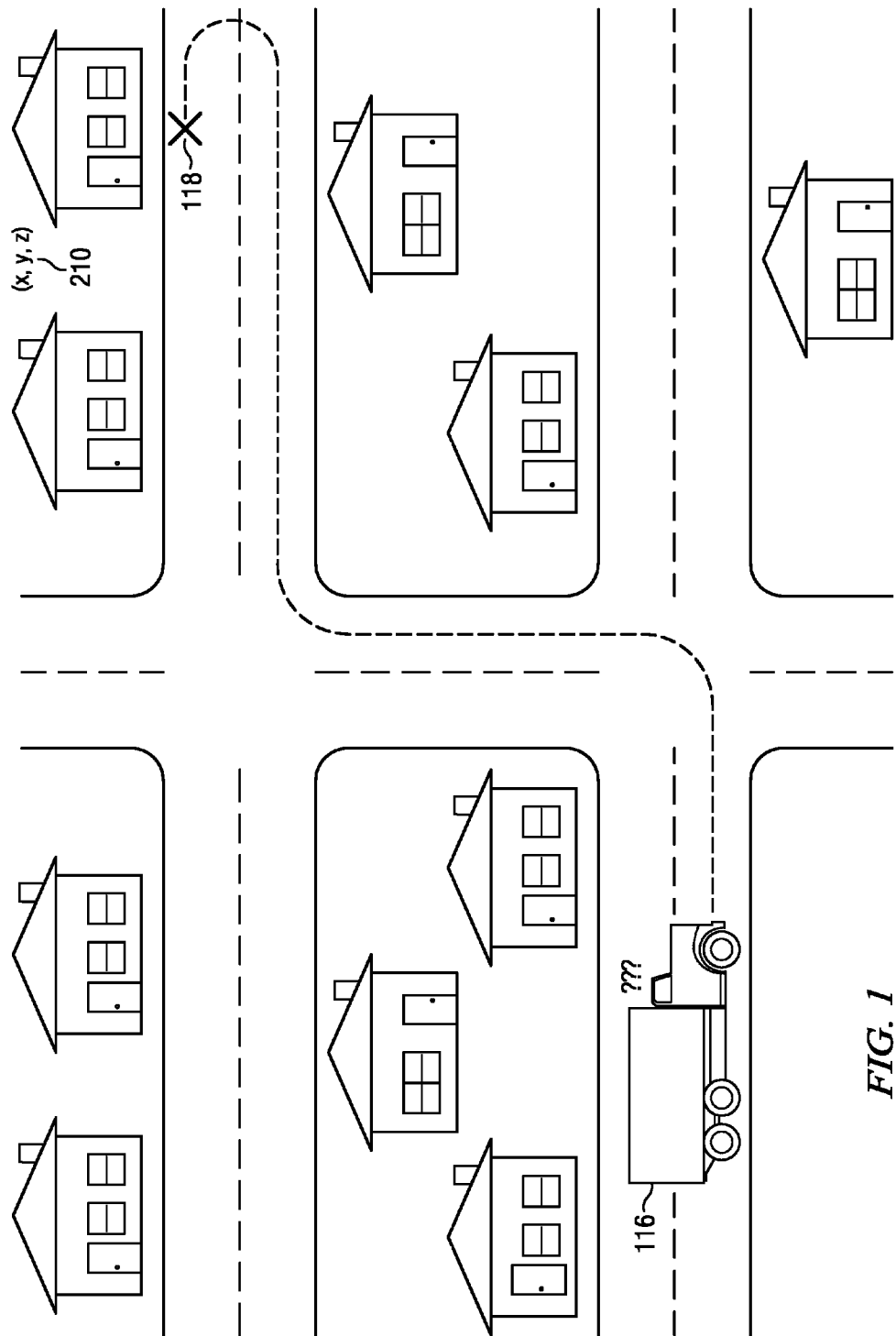
FIG. 1 illustrates a deliverer attempting to locate a destination site.

FIG. 1 illustrates a transporter 116 attempting to locate a destination site 118. Transporter 116 may wish to deliver a package to destination site 118. For example, transporter 116 may be a deliverer attempting to deliver a package that a user at destination site 118 ordered from a vendor on the internet. As another example, transporter 116 may be a supplier attempting to deliver a shipment to a store. In other examples, transporter 116 may be a taxi-driver taking people to and from destination sites 118; a courier picking up or dropping off packages, materials, messages, mail, or any other types of objects to or from destination sites 118. It should be understood that transporter 116 may use a truck, car, bicycle, motorcycle, or any other suitable mode of transportation to perform its functions.

Transporter 116 may experience difficulty locating destination site 118. For example, destination site 118 may be in a rural area where a particular address may be difficult to find. As another example, transporter 116 may have been provided an incomplete or inaccurate address for destination site 118. Destination site 118 may be an apartment but the apartment number has been left off the address or a portion of the address may simply be incorrect. If transporter 116 cannot locate destination site 118, transporter 116 may have no choice but to return the package back to the sender. Usually the sender then absorbs the cost of any redelivery to destination site 118.

To help transporter 116 locate destination site 118, a system may provide transporter 116 with the geocoordinates 210 of destination site 118. The geocoordinates 210 may include the longitude, latitude, and/or altitude of destination site 118, the Global Positioning Satellite (GPS) coordinates of destination site 118, or any other information providing the geolocation of destination site 118. In some instances, the geocoordinates 210 may include the geographic location of a wireless network (e.g., wi-fi network, wireless router, mobile hotspot, cellular tower, and the like) associated with destination site 118. In other instances, the geocoordinates 210 may include the geographic location of any location recognition device associated with the delivery site 118. By using these geocoordinates 210, transporter 116 may locate destination site 118 even if the address for destination site 118 provided to transporter 116 is inaccurate or incomplete.

A user located at destination site 118 may provide transporter 116 with the geocoordinates of the destination site 118 when transporter 116 is experiencing problems locating the destination site 118. Transporter 116 may indicate to a system that transporter 116 is experiencing problems locating destination site 118. The system may then contact a user associated with destination site 118 to confirm whether the user is located at destination site 118. If the user is located at destination site 118, the system may request the user's geocoordinates. The user may provide the geocoordinates by using a device such as a cell phone or laptop. For example, an application on the user's cell phone may serve to provide the geocoordinates of the user and/or the cell phone to the system. The system may then provide transporter 116 with the geocoordinates so that transporter 116 can locate destination site 118.

Figure 2:
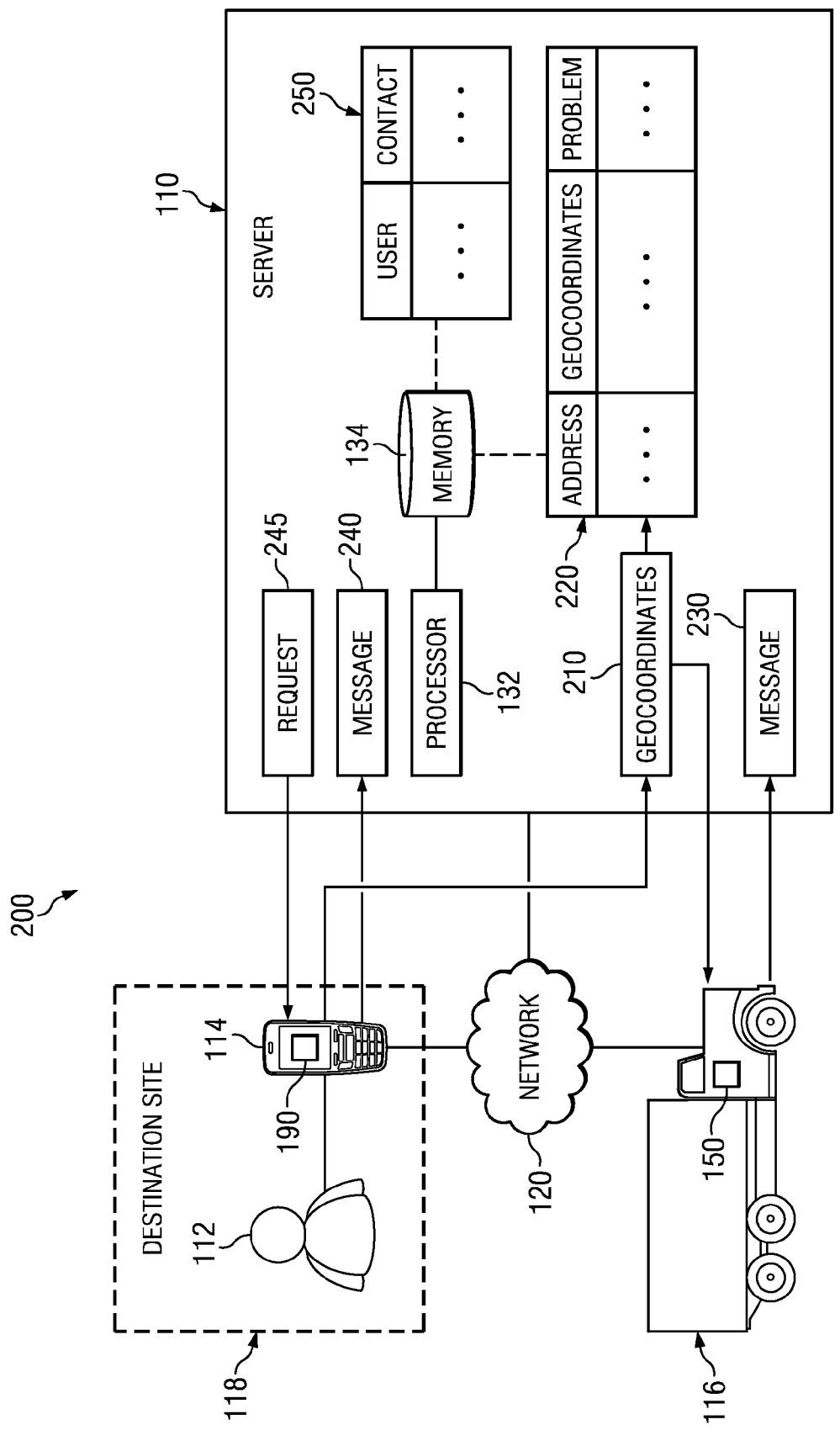
FIG. 2 illustrates a system for determining the geocoordinates of a destination site.

FIG. 2 illustrates a system 200 for determining the geocoordinates 210 of a destination site 118. As provided by FIG. 2, system 200 may include destination site 118, transporter 116, network 120, and server 110. Destination site 118 may be associated with a user 112 and the device 114. Device 114 and transporter 116 may communicate with server 110 through network 120.

In general, server 110 may receive a message 230 from transporter 116 indicating a problem locating destination site 118. Server 110 may then request and receive geocoordinates 210 of destination site 118 from user 112 and/or device 114. Server 110 may then provide these geocoordinates 210 to transporter 116 in order to help transporter 116 locate destination site 118.

System 200 may include transporter 116. Transporter 116 may be a courier, a vendor, a taxi driver, a pickup service, or any other appropriate entity that makes deliveries of people or things to destination site 118, picks up people or things from destination site 118, or otherwise travels to destination site 118 for any reason. In particular embodiments, transporter 116 may experience problems locating destination site 118. For example, destination site 118 may be in a rural area where a particular address may be difficult to find. As another example, transporter 116 may have been provided an incomplete or inaccurate address for destination site 118. Destination site 118 may be an apartment but the apartment number has been left off the address or a portion of the address may be incorrect. If transporter 116 cannot locate destination site 118, transporter 116 may have no choice but to return the package back to the sender. Usually the sender then absorbs the cost of any redelivery to destination site 118. To avoid returning the delivery to the sender, transporter 116 may use system 200 to help locate destination site 118.

For example, transporter 116 may be associated with a cell phone, laptop, global positioning system device, or any other suitable electronic device capable of electronically communicating with server 110. Depending on the context, the electronic device may be referred to as a transporter device, a delivery device, a courier device, or the like. The electronic device may include a processor running a transporter application 150 for use in system 200. Depending on the context, the transporter application 150 may be referred to as a delivery application, a courier application, or the like. Transporter 116 may use this transporter application 150 running on the electronic device to communicate a message 230 to server 110 indicating that transporter 116 is experiencing problems locating destination site 118. The message 230 may include information about the delivery, such as the address of the destination site 118, an order number associated with the delivery, the name of user 112, the location of transporter 116, and any other information that server 110 may use to determine how to direct transporter 116 to the destination site 118. Server 110 may communicate geocoordinates 210 of destination site 118 back to the transporter application 150 running on the electronic device or another device of transporter 116. Transporter 116 may then use the geocoordinates 210 to locate destination site 118 and make a delivery. In particular embodiments, server 110 may also send transporter 116 a route to follow to reach destination site 118 or the electronic device of transporter 116 may be configured to determine the route based on the geocoordinates 210 sent by server 110. Transporter 116 can follow this route to reach destination site 118.

System 200 may include destination site 118 associated with user 112 and device 114. Destination site 118 may be a house, an apartment, a store, or any other appropriate location capable of receiving deliveries.

Device 114 may be associated with user 112. For example, user 112 may own device 114 or be in possession of device 114. In particular embodiments, device 114 may receive from server 110 a request 245 to confirm whether user 112 and/or device 114 are located at destination site 118. Device 114 may receive this request 245 because transporter 116 has indicated to server 110 that transporter 116 is experiencing problems locating destination site 118. Device 114 may send a message 240 to server 110 confirming that user 112 and device 114 are at the destination site. User 112 may initiate the sending of message 240 by using device 114 to respond to the server's 110 request. In particular embodiments, device 114 may receive from server 110 a request 245 for the geocoordinates 210 of destination site 118. In response to the request 245, device 114 may communicate geocoordinates 210 to server 110. In particular embodiments, the request 245 to confirm whether user 112 and/or device 114 are located at deliver site 118 and the request 245 for the geocoordinates 210 may be the same request 245. In other embodiments, the requests 245 may be two separate requests 245. In particular embodiments, a user application 190 executing on device 114 may serve to gather and to communicate geocoordinates 210 to server 110. Because user 112 and/or device 114 has already confirmed that user 112 and device 114 are located at destination site 118, the geocoordinates of device 114 would help transporter 116 locate destination site 118.

As an example and not by way of limitation, user 112 may have ordered a product from an Internet vendor. User 112 may have indicated to the vendor to deliver the product to destination site 118. The vendor may use transporter 116 to send a package containing the product to destination site 118. During delivery, transporter 116 may experience difficulties locating the destination site 118. Rather than return the package to the vendor, transporter 116 may notify server 110 that he is experiencing problems locating destination site 118. In response, server 110 may ask the user 112 whether he is at the destination site 118. User 112 can confirm that he is at destination site 118, and server 110 may then request the geocoordinates of the user's 112 current location. User 112 may then use device 114 to provide server 110 with the geocoordinates of destination site 118.

Device 114 may be a personal computer, a workstation, a laptop, a wireless or cellular telephone, an electronic notebook, a personal digital assistant, a tablet, or any other device (wireless, wireline, or otherwise) capable of receiving, processing, storing, and/or communicating information with other components of system 100. Device 114 may also include a user interface, such as a display, a touchscreen, a microphone, keypad, or other appropriate terminal equipment usable by user 112. Device 114 may include a global positioning system receiver that device 114 may use to determine or receive the geocoordinates 210 of device 114. In particular embodiments, device 114 may send geocoordinates 210 to server 110.

System 200 includes network 120. In particular embodiments, network 120 may facilitate communication amongst transporter 116, device 114, server 110, and any other appropriate elements of system 200. For example, messages 230 and 240, requests 245, and geocoordinates 210 may be communicated among the components of system 200 using network 120. This disclosure contemplates any suitable network 120 operable to facilitate communication between the components of system 100. Network 120 may include any interconnecting system capable of transmitting audio, video, signals, data, messages, or any combination of the preceding. Network 120 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

System 200 includes server 110. In particular embodiments, server 110 may be associated with a provider of products or services such as a vendor. The vendor may have initiated the delivery process after user 112 made a purchase from the vendor. The vendor may use server 110 for additional order fulfillment functions. For example, the vendor may use server 110 to track and maintain orders. Furthermore, the vendor may use server 110 to help transporter 116 locate destination site 118.

Server 110 includes processor 132 and memory 134. The functions described herein may be performed by processor 132 and/or memory 134. In particular embodiments, memory 134 may store information associated with system 200. For example, memory 134 may store in a table 250 contact information for users 112. Contact information may include email addresses, phone numbers, or any other appropriate information used to contact user 112. As another example, memory 134 stores location information in table 220 such as addresses and geocoordinates of those addresses. Memory 134 may further store in table 220 previous problems with locating a particular address. As an example, memory 134 may store the address and geocoordinates of destination site 118 in table 220. Memory 134 may also store whether there have been any problems locating destination site 118 in table 220. This disclosure contemplates tables 220 and 250 being arranged in any suitable manner within memory 134.

Memory 134 may store, either permanently or temporarily, data, operational software, or other information for processor 132. Memory 134 may include any one or a combination of volatile or non-volatile local or remote devices suitable for storing information. For example, memory 134 may include random access memory (RAM), read only memory (ROM), magnetic storage devices, optical storage devices, or any other suitable information storage device or a combination of these devices. Although memory 134 is illustrated as part of server 110, it can be configured in any suitable format, including without limitation in a centralized configuration at server 110 or in a distributed format among many devices within system 200.

Processor 132 may be communicatively coupled to memory 134. In particular embodiments, processor 132 may send requests 245 to device 114 to confirm that user 112 and device 114 are located at destination site 118. If user 112 and/or device 114 are at the deliver site 118, processor 132 may use the geocoordinates 210 of device 114 as the geocoordinates 210 of the destination site 118. Processor 132 may send requests 245 for geocoordinates 210. User 112 may then respond to the request 245 by using device 114 to send geocoordinates 210 to server 110. Processor 132 may receive these geocoordinates 210 from device 114.

Processor 132 may also receive messages 230 and 240 from elements of system 200. For example, processor 132 may receive message 240 from device 114 indicating whether user 112 and/or device 114 are located at destination site 118. After receiving message 240, processor 132 may determine that user 112 and/or device 114 is at the destination site. As another example, processor 132 may receive message 230 from transporter 116 indicating a problem associated with locating destination site 118. After receiving message 230, processor 132 may acquire geocoordinates 210 from user 112 and send them to transporter 116.

Processor 132 may control the operation and administration of server 110 by processing information received from network 120 and memory 134. Processor 132 may include any hardware and/or software that operates to control and process information. Processor 132 may be a programmable logic device, a microcontroller, a microprocessor, any suitable processing device, or any suitable combination of the preceding.

In operation, system 200 may help transporter 116 locate destination site 118. Transporter 116 may be delivering a package to destination site 118. Transporter 116 may experience difficulties locating destination site 118. Transporter 116 may communicate a message 230 to server 110 indicating that transporter 116 is experiencing difficulties locating destination site 118. The message 230 may include the address of the destination site 118, an order number associated with the delivery, the name of user 112, and any other suitable information that server 110 may use to determine which destination site 118 the transporter 116 is attempting to locate. To help transporter 116 locate destination site 118, server 110 may perform processes that ultimately result in the sending of geocoordinates 210 of destination site 118 to transporter 116.

After receiving message 230, server 110 may determine whether the geocoordinates 210 of destination site 118 are stored in memory 134. In particular embodiments, the geocoordinates 210 of destination site 118 may be stored in table 220. If server 110 determines that the geocoordinates 210 of destination site 118 are already stored in table 220, server 110 may retrieve the geocoordinates 210 and send them to transporter 116. In particular embodiments, server 110 may generate and send a message comprising the geocoordinates 210 to transporter 116. The message may also include directions or a route that transporter 116 can follow to locate destination site 118. The message may further indicate to transporter 116 if user 112 or another person is at destination site 118 to receive the delivery. In particular embodiments, a device associated with transporter 116 may use the message to determine a route that transporter 116 can follow to locate destination site 118.

If server 110 determines that the geocoordinates 210 of destination site 118 are not stored in table 220, server 110 may attempt to retrieve the geocoordinates 210 of the destination site 118 from user 112 and/or device 114. Server 110 may first contact user 112 to confirm whether user 112 is at the destination site 118. In particular embodiments, server 110 may use contact information of user 112 stored in table 250 to contact user 112. For example, server 110 may use an email address associated with user 112 to send an email to user 112. As another example, server 110 may use a phone number associated with user 112 to send a voicemail or text message to user 112. The message may inform the user 112 that a delivery from the vendor is en route, but that the transporter 116 is having difficulties locating the destination site 118. The message may also inform user 112 of an order number or a product description associated with the delivery. The message may ask user 112 to use device 114 to provide geocoordinates 210 if the user 112 is at the destination site 118. In this manner, user 112 may be prompted to provide geocoordinates 210 to server 110. Although this disclosure describes server 110 sending particular types of messages to user 112, this disclosure contemplates server 110 sending any appropriate type of message to user 112.

In particular embodiments, the message that server 110 sends to user 112 may request user 112 to confirm whether user 112 is located at destination site 118. For example, server 110 may send an email to which user 112 may reply with an indication of whether user 112 is at destination site 118. As another example, server 110 may send user 112 a text message to which user 112 can respond with an indication whether user 112 is at destination site 118. If device 114 is located at the destination site 118, then the geocoordinates of device 114 may be used as the geocoordinates of destination site 118. In particular embodiments, server 110 may receive a message 240 indicating whether user 112 is located at destination site 118. In some embodiments, user 112 may know the geocoordinates 210 of destination site 118 and may input the geocoordinates 210 into device 114. In this manner, user 112 may provide server 110 the geocoordinates 210 of destination site 118 even though user 112 and/or device 114 are not located at destination site 118.

If server 110 determines that user 112 is not at destination site 118, server 110 may indicate to transporter 116 that geocoordinates 210 associated with destination site 118 are not available. For example, server 110 may send a message or notification to transporter 116 indicating that the geocoordinates 210 of destination site 118 are unavailable. In particular embodiments, server 110 may approximate the geocoordinates 210 and send them to transporter 116. The process by which server 110 determines approximate geocoordinates will be discussed with respect to FIG. 3.

If server 110 determines that user 112 is located at destination site 118, server 110 may request user 112 to provide geocoordinates 210. In response to the request, user 112 may use device 114 to provide geocoordinates 210 to server 110. For example, server 110 may send an alert or notification to device 114. When device 114 receives the alert or notification, device 114 may present the alert or notification on a display. Additionally, device 114 may vibrate or generate a sound to make user 112 aware that device 114 has received the alert or notification. The alert or notification may inform user 112 that a delivery from the vendor is en route, but the transporter 116 is having difficulties locating the destination site 118. The alert or notification may inform user 112 to use device 114 to provide geocoordinates 210 in order to help transporter 116 locate the destination site if the user 112 is at the destination site 118.

When user 112 indicates the he wishes to respond to the alert or notification, device 114 may execute an application 190 that gathers and sends the geocoordinates 210 of device 114 to server 110. The application 190 may use the global positioning system features of device 114 to gather geocoordinates 210. For example, the application 190 may use a global positioning system receiver of device 114 to acquire the geocoordinates of device 114. The application 190 may also allow user 112 to input the geocoordinates 210 of destination site 118. For example, the application 190 may provide a field into which user 112 may enter geocoordinates. By allowing user 112 to input the geocoordinates 210 of destination site 118, the application allows user 112 to provide the geocoordinates 210 of the destination site 118 even if the user 112 is not located at the destination site 118.

In particular embodiments, user 112 may provide geocoordinates 210 to server 110 through a website or an application running on a device 114. For example, server 110 may send an email, a text message, or any other suitable type of message to user 112 that includes a link to the website. Or, server 110 may push a message to user 112 through an application running on the user's device 114. The message may inform user 112 that a delivery is en route and that transporter 116 needs geocoordinates of the destination site 118 in order to make the delivery. The message may additionally provide details regarding the delivery including an order number and a product description. The message may further inform user 112 that geocoordinates 210 may be provided by opening the link on device 114, or by performing an appropriate process using the application on device 114. User 112 may respond to the message by opening the link on device 114 or by performing the application process on device 114. The link may be to a website that includes an application or provides an interface through which device 114 may send geocoordinates 210 of device 114 to server 110. For example, by opening the link, device 114 may open a website that triggers the application 190 on device 114 to retrieve and send the geocoordinates 210 of device 114 to server 110. Or, the application running on device 114 may present an interface through which device 114 may send geocoordinates 210 of device 114 to server 110. Because user 112 has already confirmed that user 112 and/or device 114 are located at the destination site 118, the geocoordinates 210 may be used to help locate destination site 118.

In related embodiment, user 112 may forward the message to another person's device so that the other person may send geocoordinates 210 to server 110 on behalf of user 112 using any of the techniques described above (e.g., link to website or application running on device). This embodiment may be useful when user 112 is not actually at the destination site 118 whose geocoordinates are requested, but the other person is located at the destination site 118. For example, user 112 may be at work when user 112 receives the message to send the geocoordinates of the user's home, where delivery will be made. However, the user's spouse may be at home. Thus, user 112 could forward the message to the spouse and have the spouse send the geocoordinates 210 of their home to server 110. In still another embodiment, user 112 may forward the message from one device 114 to another device 114 in order to send geocoordinates 210 to server 110. For example, a user 112 may receive the message on a laptop that does not have GPS capabilities, and then forward the message to a mobile phone that does have GPS capabilities. The user 112 may then use the mobile phone to send the geocoordinates 210 to server 110.

After server 110 receives the geocoordinates 210 of device 114, server 110 may communicate the geocoordinates 210 to transporter 116. In particular embodiments, server 110 may generate and send a message comprising the geocoordinates 210 to a device associated with transporter 116. The message may be a text message, email message, page, or any other suitable type of message that the device of transporter 116 may receive. The message may inform transporter 116 of the geocoordinates 210 of destination site 118. In particular embodiments, the message may also inform transporter 116 of a route to follow to locate destination site 118. Transporter 116 may further use the geocoordinates 210 to locate destination site 118 by inputting the geocoordinates 210 into a global positioning system device that can plan a route for transporter 116 to follow to reach destination site 118. The process performed by server 110 described above will be discussed further with respect to FIG. 5.

In addition to gathering and sending geocoordinates 210 to transporter 116, server 110 may perform additional functions with regards to geocoordinates 210. For example, server 110 may store the geocoordinates 210 for particular addresses in memory 134, such as in table 220. These geocoordinates 210 may have been received from a user 112, as described above. Additionally, these geocoordinates may have been received from a transporter 116 upon making a successful transport to a particular address. For example, upon making a successful transport to a particular address, the transporter 116 may capture the geocoordinates of that address and communicate them to server 110 for storage in table 220 of memory 134. Thus, if a future transport to the same address becomes necessary, then the stored geocoordinates 210 may be used. In another example, server 110 may use geocoordinates 210 to determine the geocoordinates of other addresses. In still another example, server 110 can request geocoordinates 210 based on previous problems associated with locating addresses near a destination site 118. These functions will be described further with respect to FIGS. 3, 4, and 6.

Figure 3:
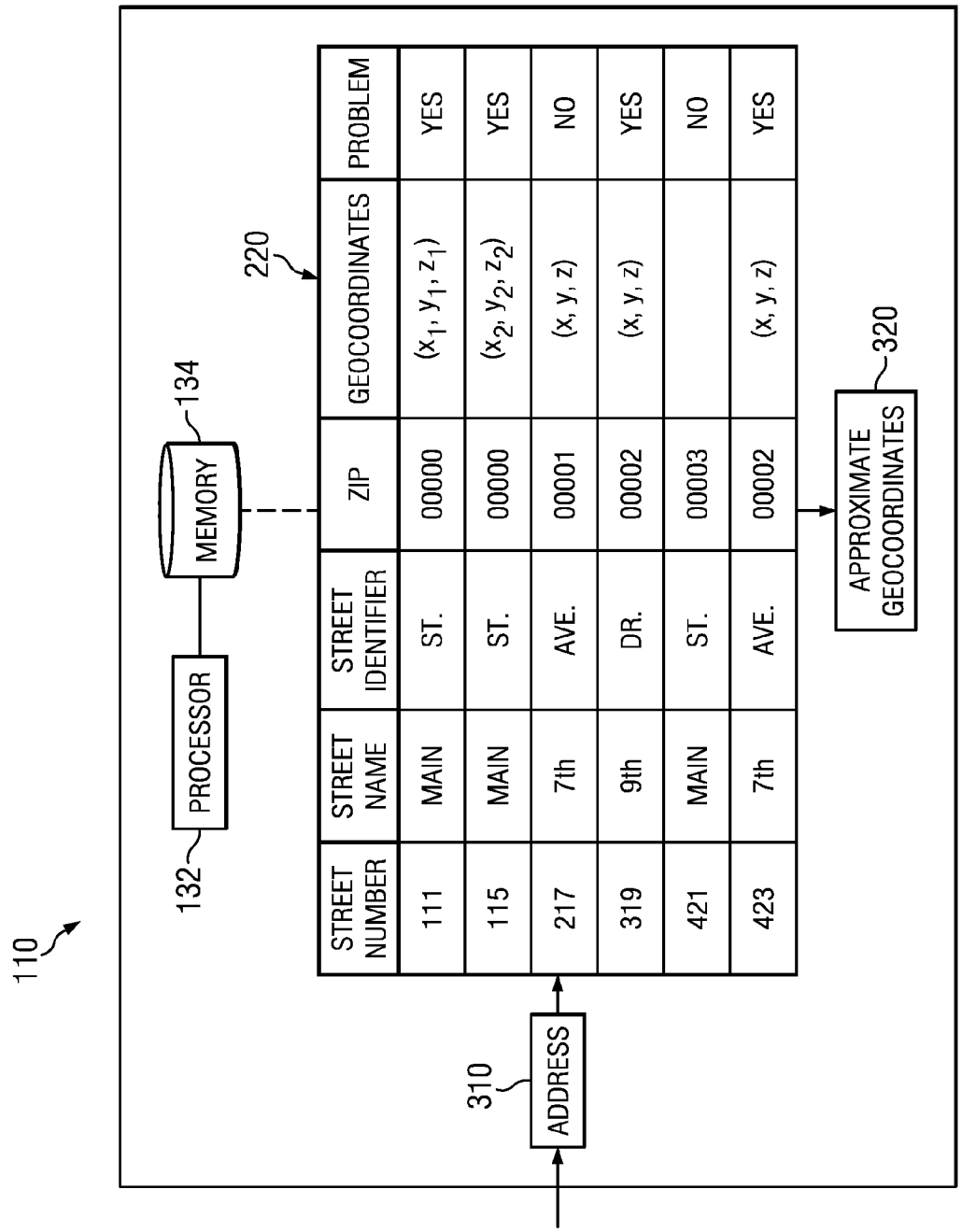
FIG. 3 illustrates the server of FIG. 2 in conjunction with a table used for determining approximate geocoordinates for an address.

FIG. 3 illustrates the server 110 of FIG. 2 in conjunction with a table 220 used for determining approximate geocoordinates 320 for an address 310. As provided by FIG. 2, server 110 may receive address 310 and use address 310 and table 220 to determine approximate geocoordinates 320. Generally, server 110 may use the geocoordinates stored in table 220 to approximate the geocoordinates 320 of a received address 310. In the example illustrated in FIG. 3, some of the columns of table 220 have been expanded to illustrate particular portions of an address. However, these columns may be merged or combined to form any appropriate number of columns.

Table 220 may include information pertaining to destination sites 118. In the example illustrated in FIG. 3, table 220 includes the address and geocoordinates of destination sites 118. Table 220 also includes entries indicating whether there have been previous delivery problems associated with destination sites 118. Although FIG. 3 illustrates the information listed in the "problem" column in terms of "yes" or "no," it should be understood that the "problem" may be represented in any suitable format, including but not limited to Boolean indicators, alphanumeric characters, a range of issues (e.g., "yes within 1 mile of this address"). This disclosure contemplates table 220 including any suitable information pertaining to destination site 118, such as for example, the number of previous delivery problems, the number of previous deliveries, a percentage of total deliveries that have been successful. Server 110 may reference the information in table 220 to help transporter 116 locate destination site 118.

Server 110 may maintain table 220. For example, server 110 may store and update table 220 over time to track geocoordinates 210 of destination sites 118. Server 220 may also update table 220 to track previous delivery problems associated with the destination sites 118. This disclosure contemplates table 220 being maintained in any suitable manner to track any appropriate information associated with destination site 118.

Server 110 may receive an address 310. Address 310 may be sent by any appropriate element of system 200. For example, transporter 116 may send address 310 as part of a message 230 indicating that transporter 116 is experiencing problems locating address 310. As another example, a vendor may send address 310 to server 110 expecting server 110 to return the geocoordinates associated with address 310.

After receiving address 310, server 110 may examine table 220 to determine whether address 310 is stored in table 220. Specifically, server 110 may determine whether the street number, street name, street identifier, and/or zip code of any address stored in table 220 matches those of address 310. If server 110 determines that address 310 is stored within table 220, server 110 may continue to determine whether the geocoordinates of address 310 are stored in table 220. If server 110 determines that the geocoordinates of address 310 are also stored in table 220, server 110 may communicate the geocoordinates of address 310 from table 220. For example, if transporter 116 sends an address 310 of "111 Main St." with a zip code of "00000," server 110 may determine that that address 310 is stored in table 220 and return the geocoordinates 210 of (x1, y1, z1) that are stored in table 220 for that address.

If server 110 determines that either address 310 or the geocoordinates of address 310 are not stored in table 220, server 110 may generate approximate geocoordinates 320 of address 310. The approximate geocoordinates 320 may provide a transporter 116 or a vendor some assistance in locating a destination site 118. For example, the approximate geocoordinates 320 may inform transporter 116 of the approximate location of destination site 118. Transporter 116 may be able to locate the exact location of destination site 118 given the approximate geocoordinates 320.

Server 110 may use addresses that are near or within a predetermined distance of destination site 118 to determine the approximate geocoordinates 320. In particular embodiments, server 110 may use table 220 to determine addresses that are near address 310. For example, server 110 may determine addresses in table 220 that have the same zip code as address 310. As another example, server 110 may determine the addresses in table 220 that are on the same street as address 310. After determining these addresses, server 110 may use the geocoordinates of these addresses to approximate the geocoordinates 320 of address 310.

For example, transporter 116 may request the geocoordinates 210 of "113 Main St." in zip code "00000." Server 110 may determine that that address 310 is not stored in table 220. Server 110 may then determine that the first two addresses illustrated in table 220 in the example of FIG. 3 are near address 310 because the zip codes and street names of those two addresses match those of the given address 310. Server 110 may then use the geocoordinates (x1, y1, z1) and (x2, y2, z2) of those two addresses to approximate the geocoordinates 320 of address 310. For example, server 110 may determine based on the two addresses that address 310 should be located in between "111 Main St." and "115 Main St." Server 110 may then approximate the geocoordinates 320 of address 310 to be somewhere in between (x1, y1, z1) and (x2, y2, z2). For example, the approximate geocoordinates 320 may be (x3, y3, z3) with x1<x3<x2, y1<y3<y2, and z1<z3<z2. Even though (x3, y3, z3) may not be the exact geocoordinates for destination site 210, transporter 116 may still be able to use (x3, y3, z3) to locate the destination site 118 on a map or on a global positioning system device. Although this disclosure describes geocoordinates using particular numbers, this disclosure contemplates geocoordinates being of any appropriate number. For example, geocoordinates may represent the latitude, longitude, and altitude of an address. By providing transporter 116 with the approximate geocoordinates 320 of destination site 118, system 200 may help transporter 116 locate destination site 118 even though the geocoordinates 210 of destination site 118 are unavailable and user 112 is unavailable to provide the geocoordinates 210. For example, a global positioning system receiver of transporter 116 may provide transporter 116 with a route to destination site 118 if given the approximate geocoordinates 210.

In particular embodiments, server 110 may further determine a distance between the destination site 118 and the stored addresses. Server 110 may use that distance to approximate the geocoordinates 320 of the destination site 118. For example, server 110 may determine that buildings on Main Street are twenty feet apart from one another. Server 110 may then use that distance to determine that "113 Main St." is twenty feet from "111 Main St." and twenty feet from "115 Main St." Server 110 may then use that information to approximate the geocoordinates 320 of "113 Main St."

In particular embodiments, after server 110 determines the approximate geocoordinates 320 of address 310, server 310 may communicate the approximate geocoordinates 320. For example, server 110 may communicate approximate geocoordinates 320 to a transporter 116 that is experiencing difficulties locating a destination site associate with address 310. As another example, server 110 may send approximate geocoordinates 320 to a vendor that needs to determine the geocoordinates of address 310. In particular embodiments, server 110 may additionally send the geocoordinates of the addresses that are near address 310. In this manner, the vendor may plot these geocoordinates on a map to determine an area in which the address 310 may be located.

As an example, transporter 116 may be experiencing difficulties locating a home destination site 118. Transporter 116 sends the address associated with the home to server 110. However, server 110 determines that the recipient of the delivery is not at the home and that the geocoordinates of the home are not already stored in the server 110. Instead of sending a message to transporter 116 stating that the geocoordinates are unavailable, server 110 may determine whether there are geocoordinates for addresses near the home. Server 110 may find some of these addresses and use their associated geocoordinates to approximate the geocoordinates of the home. For example, server 110 may have the geocoordinates for some neighboring homes. Server 110 may use these geocoordinates to provide transporter 116 an approximate location of the home. Transporter 116 may use these approximate geocoordinates to locate the exact location of the home on a map or global positioning system device.

Figure 4:
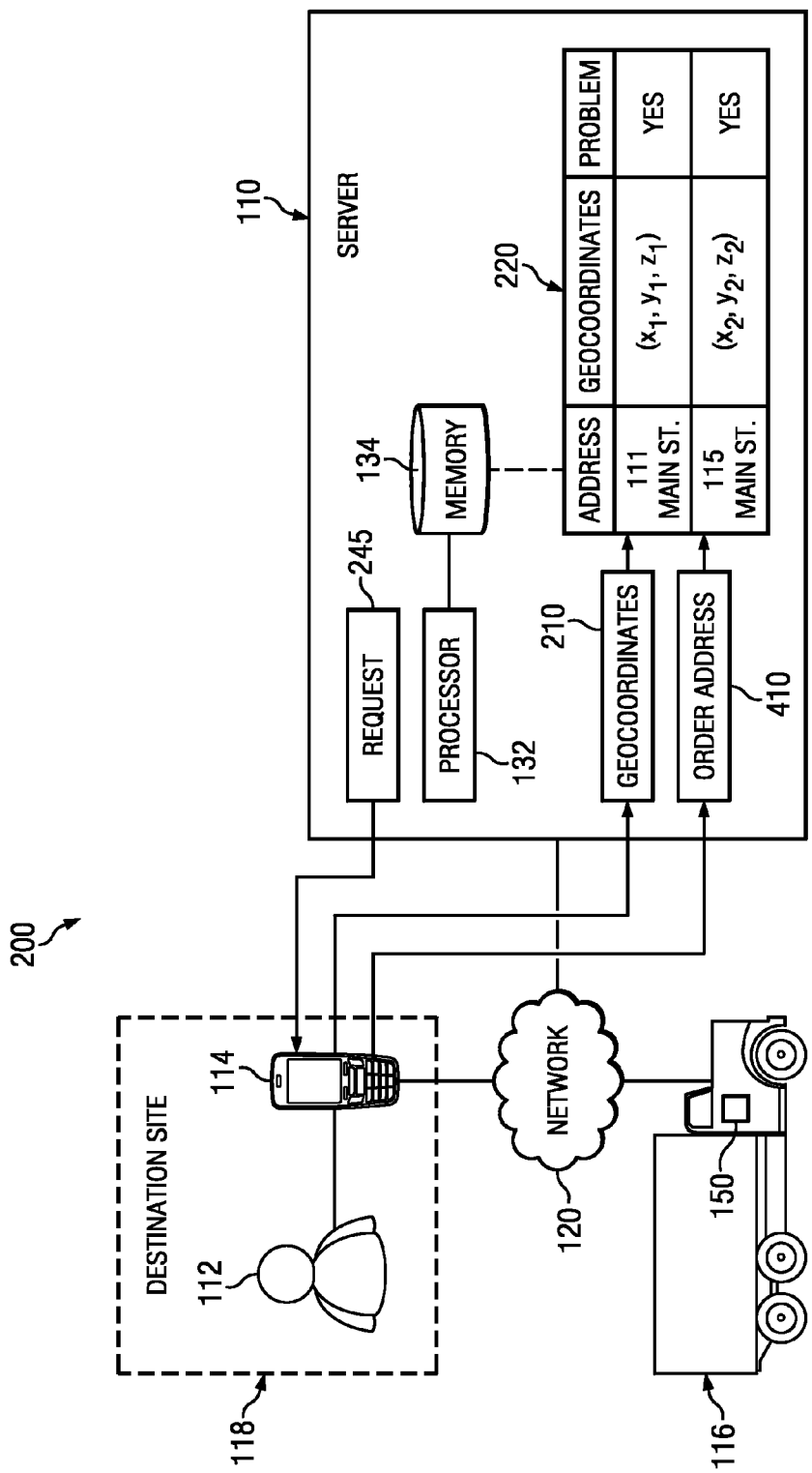
FIG. 4 illustrates the system of FIG. 2 determining geocoordinates based on previous problems locating a destination site.

FIG. 4 illustrates system 200 of FIG. 2. In one embodiment, system 200 is used by a user 112 during a checkout process. In this embodiment, during the checkout process, server 110 may prompt user 112 to use 114 to provide one or more sets of geocoordinates 210 for one or more corresponding destination sites 118. Server 110 may then use the received one or more sets of geocoordinates to determine one or more corresponding destination addresses for the destination sites 118, and provide either or both of the geocoordinates and the destination addresses to transporter 116 for subsequent usage. Server 110 may store the received geocoordinates for the destination sites 118 and the associated destination addresses in table 220 of memory 134. In this way, server 110 may build up a database of geocoordinates and destination addresses for its users 112.

In a particular embodiment, server 110 may request geocoordinates from users 112 upon determining that there are problems locating the associated destination sites 118, as described in greater detail below. As provided by FIG. 4, table 220 may include a column labeled "problem". Information in that column may indicate whether there have been previous problems associated with locating particular addresses. Server 110 may use the information in this column to determine when to request the geocoordinates of a particular destination site 118. Although not illustrated, this disclosure contemplates table 220 further including other information associated with destination sites 118 including addresses of destination site 118, geocoordinates 210 of destination sites 118, number of previous orders delivered to destination sites 118, and any other suitable information associated with destination sites 118.

In particular embodiments, server 110 may use the "problem" column to determine whether to preemptively request the geocoordinates 210 of a destination site 118. For example, user 112 may be ordering a product from an online vendor associated with server 110. As part of the checkout process, user 112 may supply server 110 with the address of the destination site 118. Server 110 may determine that that address and corresponding geocoordinates 210 are not stored in table 220, however, it may be efficient to ask user 112 to use device 114 to provide geocoordinates 210 for destination site 118 during the checkout process if a delivery problem is anticipated. To determine whether there may be a delivery problem, server 110 may compare the address of the destination site 118 with addresses of other destination sites stored in table 220 to determine which other destination sites are near the destination site 118. Server 110 may then determine whether transporters 116 experienced problems locating these other destination sites. If so, server 110 may anticipate that transporter 116 will experience a delivery problem locating the destination site 118. Server 110 may then preemptively address the delivery problem by requesting and receiving the geocoordinates for the destination site 118 from user 112 and/or device 114. In this manner, when transporter 116 notifies server 110 that he is experiencing problems locating destination site 118, server 110 will already have stored the geocoordinates 210 for the destination site 118 and can provide the geocoordinates 210 to the transporter 116.

In particular embodiments, server 110 may receive an address 410. Address 410 may have been sent by user 112 and may be the address associated with destination site 118. For example, user 112 may provide address 410 as part of a transaction with a vendor on the internet. User 112 may provide address 410 as part of the checkout process with the vendor. User 112 expects the vendor to deliver a purchase to address 410. Address 410 and geocoordinates 210 associated with address 410 may not be stored in server 110.

Server 110 may determine that address 410 or the geocoordinates associated with address 410 are not stored within table 220. In particular embodiments, this may mean that address 410 is an address to which the vendor has not previously made a delivery. In response to that determination, server 110 may examine whether there have been previous problems associated with locating addresses near address 410. For example, address 410 may be "113 Main St." Server 110 may determine two addresses in table 220, "111 Main St." and "115 Main St." that are near address 410. Server 110 may then examine the column labeled "problem" to determine whether there have been previous problems associated with locating "111 Main St." and "115 Main St." If there have not been previous problems locating addresses near address 410, then server 110 may continue the transaction.

However, if there have been previous problems locating "111 Main St." and "115 Main St.", server 110 may anticipate that a transporter 116 will encounter problems locating "113 Main St." In order to preemptively address this problem, server 110 may request the user 112 to provide the geocoordinates 210 associated with destination site 118. Server 110 may communicate a message 240 to user 112 requesting the geocoordinates of the destination site 118. The message 240 may inform user 112 that addresses nearby his supplied address have encountered delivery problems in the past, and as a result, system 200 anticipates that delivery problems may occur for the destination site 118. The message 240 may further request the user 112 to use device 114 to provide geocoordinates 210 if the user 112 is located at the destination site 118. These geocoordinates 210 may be provided later to a transporter 116 attempting to deliver the package to the destination site 118. Following the process described with respect to FIG. 2, user 112 may respond to the message 240 and use device 114 to provide server 110 with geocoordinates 210 associated with address 410. Server 110 may then store the address 410 and the geocoordinates 210 in table 220. In this manner, server 110 may preemptively gather geocoordinates 210 when problems associated with locating destination site 118 are expected. When transporter 116 is attempting to deliver a package to destination site 118, server 110 may provide transporter 116 the geocoordinates of destination site 118 without having to request the geocoordinates 210 from user 112 at that time.

In certain embodiment, server 110 may have received geocoordinates 210 from a user 112 for a destination site 118 and may have also approximated geocoordinates 210 for a destination site 118 using any of the techniques described above. In such an embodiment, server 110 may compare the received geocoordinates 210 with the approximated geocoordinates 210 to determine whether there is any discrepancy. If there is a discrepancy that is greater than a particular magnitude (e.g., the received geocoordinate 210 is a large distance away from the approximated geocoordinate 210), then server 110 may communicate a message to user device 114 to request updated geocoordinates 210. Or, server 110 may take other corrective measures, such as recalculating the approximated geocoordinates 210.

Figure 5:
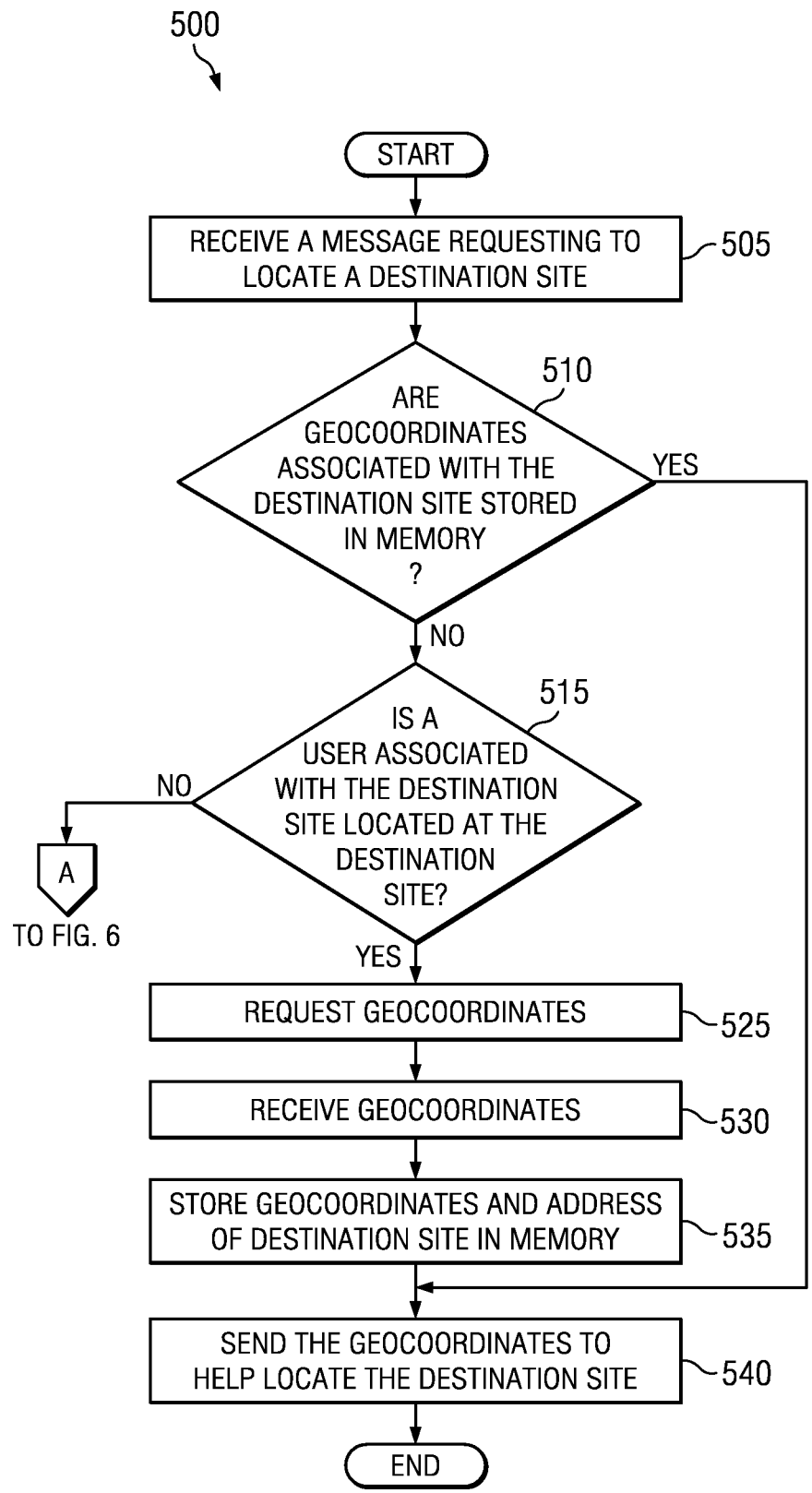
FIG. 5 is a flowchart illustrating a method of determining the geocoordinates of a destination site.

FIG. 5 is a flowchart illustrating a method 500 of determining the geocoordinates 210 of a destination site 118. Server 110 may perform method 500. In step 505, server 110 may receive a message 230 indicating a problem locating a destination site 118. The message 230 may have been sent by a transporter 116 who is attempting to deliver a package to the destination site 118. The message 230 may further include the name of user 112, the transporter's 116 location, an order number, and any other appropriate information that server 110 may use to determine how to help transporter 116 locate destination site 118. In step 510, server 110 may determine whether geocoordinates 210 associated with the destination site 118 are stored in memory 134. In particular embodiments, server 110 may determine whether geocoordinates 210 are stored in table 220. If the geocoordinates 210 are stored in table 220, execution proceeds to step 540 where server 110 sends the geocoordinates 210 to transporter 116 to help locate the destination site 118.

If the geocoordinates 210 are not stored in table 220, server 110 may determine whether a user 112 associated with the destination site 118 is located at the destination site 118. In particular embodiments, server 110 may send a message to user 112 requesting user 112 to confirm whether user 112 is located at destination site 118. The message may inform user 112 that a delivery is en route and that the transporter 116 is experiencing difficulties locating the destination site 118. The message may further request that user 112 indicate whether user 112 is located at the destination site 118. User 112 may respond to that message to indicate to server 110 whether user 112 is located at destination site 118. If server 110 determines that user 112 is not at the destination site 118, server 110 may proceed to step 615 of method 600 illustrated in FIG. 6.

If server 110 determines that user 112 is located at the destination site, server 110 may continue to step 525 to request the geocoordinates 210 associated with the destination site 118. In particular embodiments, server 110 may send a request for geocoordinates 210 to user 112. The request may ask user 112 to use device 114 to provide geocoordinates 210 in order to help transporter 116 locate the destination site 118. Because the user 112 has confirmed that user 112 and/or device 114 are located at the destination site 118, server 110 may use the geocoordinates 210 of device 114 as the geocoordinates 210 of destination site 118. User 112 may use device 114 to send server 110 the geocoordinates 210 of device 114. In step 530 server 110 may receive the geocoordinates 210 and in step 535 server 110 may store the geocoordinates and the address of the destination site 118 in memory 134, specifically table 220. Server 110 may then conclude in step 540 by sending the geocoordinates 210 of destination site 118 to transporter 116 in order to help transporter 116 locate the destination site 118.

Figure 6:
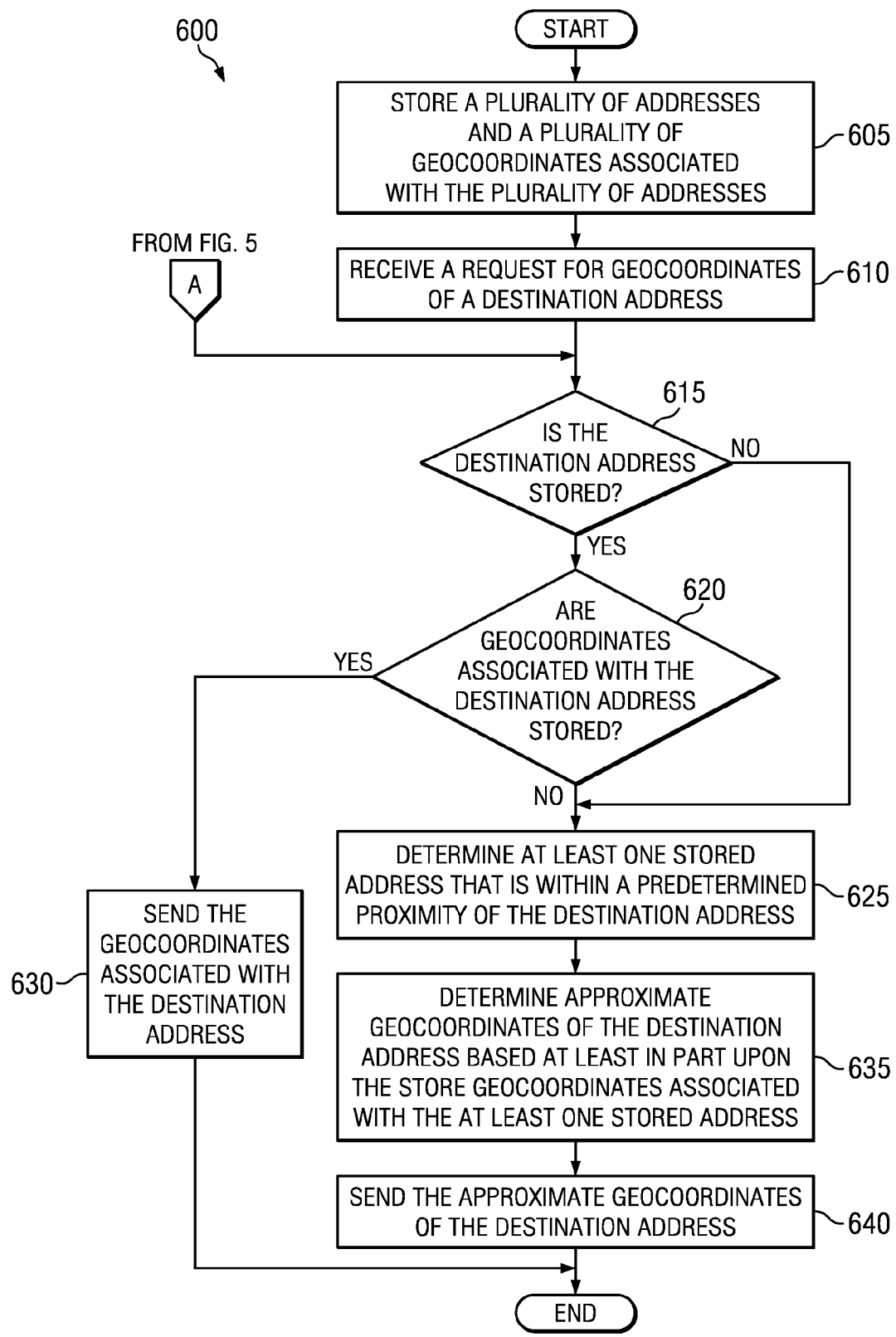
FIG. 6 is a flowchart illustrating a method of determining approximate geocoordinates for an address.

FIG. 6 is a flowchart illustrating a method 600 of determining approximate geocoordinates 320 for a destination address. Server 110 may perform method 600. In step 605 server 110 may store a plurality of addresses and a plurality of geocoordinates associated with the plurality of addresses in table 220. In step 610 server 110 may receive a request for geocoordinates 210 of a destination address. In response to receiving the request, server 110 may determine in step 615 whether the destination address is stored in table 220. If the destination address is stored in table 220, server 110 may continue to step 620 to determine whether geocoordinates associated with the destination address are also stored in table 220. If server 110 determines that the geocoordinates associated with the destination address are also stored, server 110 may conclude in step 630 by sending the geocoordinates 210 associated with the destination address in response to the request for the geocoordinates.

However, if server 110 determines that either the destination address or the geocoordinates associated with the destination address are not stored in table 220 in step 615 and 620, server 110 may continue to step 625 to determine at least one stored address that is within a predetermined proximity of the second address. In particular embodiments, server 110 may determine the at least one stored address by examining the plurality of stored addresses and finding the addresses within the plurality of addresses that have portions which match the destination address. For example, server 110 may determine the addresses in the plurality of addresses that have the same zip code as the destination address. As another example, server 110 may determine the addresses that have the same zip code and street name as the destination address.

In step 635 server 110 may determine approximate geocoordinates 320 of the destination address based at least in part upon the stored geocoordinates associated with the at least one stored address. In step 640 server 110 may conclude by sending the approximate geocoordinates 320 of the destination address in response to the request for the geocoordinates of the destination address.

Figure 7:
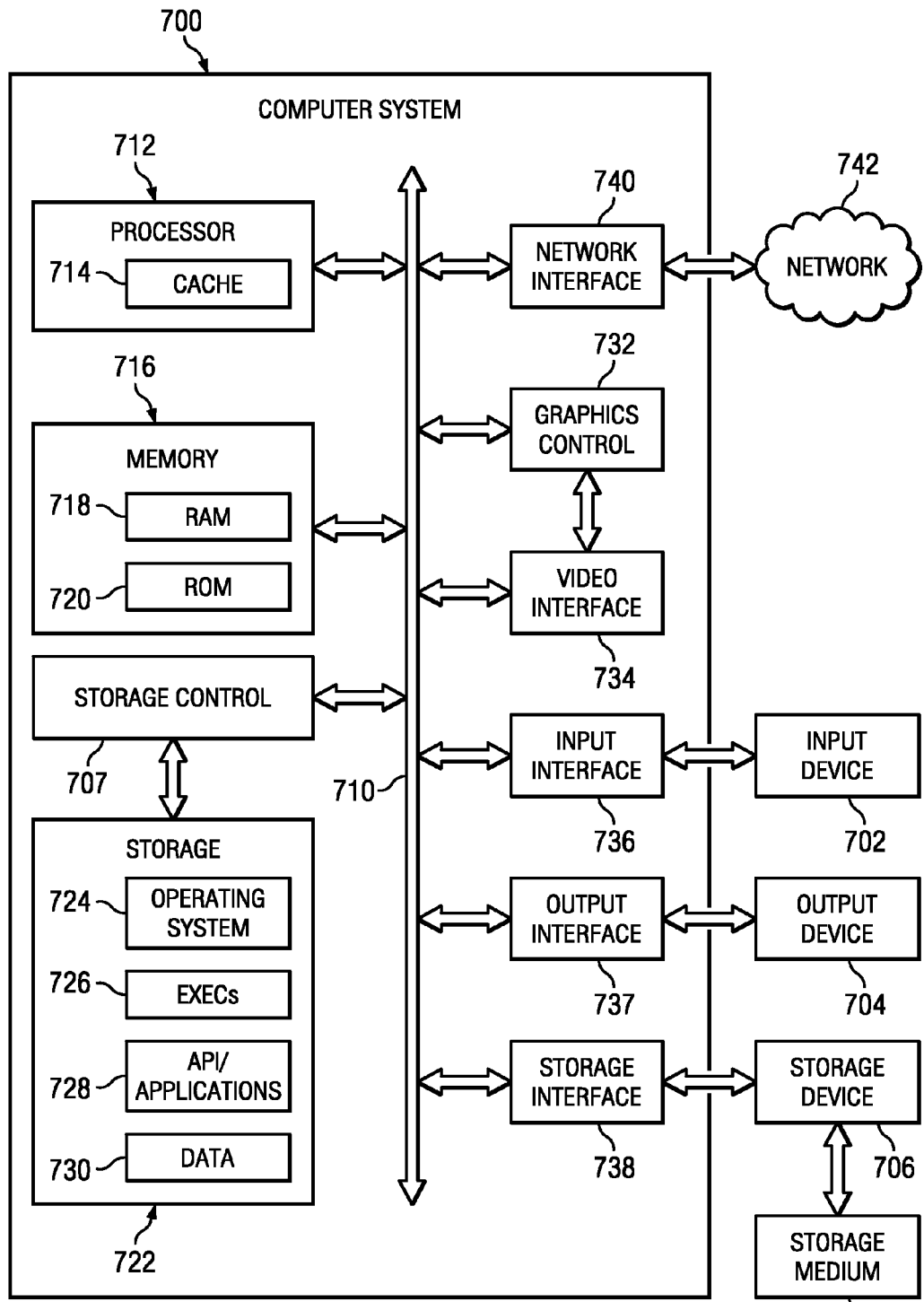
FIG. 7 illustrates an example computer system 700 that may be used for one or more portions of the example system 100 of FIG. 1, according to certain embodiments of the present disclosure.

FIG. 7 illustrates an example computer system 700 that may be used for one or more portions of the example system 100 of FIG. 1, according to certain embodiments of the present disclosure. Although the present disclosure describes and illustrates a particular computer system 700 having particular components in a particular configuration, the present disclosure contemplates any suitable computer system having any suitable components in any suitable configuration. Moreover, computer system 700 may have take any suitable physical form, such as for example one or more integrated circuit (ICs), one or more printed circuit boards (PCBs), one or more handheld or other devices (such as mobile telephones or PDAs), one or more personal computers, one or more super computers, one or more servers, and one or more distributed computing elements. Portions or all of user system 102, server system 106, storage module 108, and computing resources 110 may be implemented using all of the components, or any appropriate combination of the components, of computer system 700 described below.

Computer system 700 may have one or more input devices 702 (which may include a keypad, keyboard, mouse, stylus, or other input devices), one or more output devices 704 (which may include one or more displays, one or more speakers, one or more printers, or other output devices), one or more storage devices 706, and one or more storage media 708. An input device 702 may be external or internal to computer system 700. An output device 704 may be external or internal to computer system 700. A storage device 706 may be external or internal to computer system 700. A storage medium 708 may be external or internal to computer system 700.

System bus 710 couples subsystems of computer system 700 to each other. Herein, reference to a bus encompasses one or more digital signal lines serving a common function. The present disclosure contemplates any suitable system bus 710 including any suitable bus structures (such as one or more memory buses, one or more peripheral buses, one or more a local buses, or a combination of the foregoing) having any suitable bus architectures. Example bus architectures include, but are not limited to, Industry Standard Architecture (ISA) bus, Enhanced ISA (EISA) bus, Micro Channel Architecture (MCA) bus, Video Electronics Standards Association local (VLB) bus, Peripheral Component Interconnect (PCI) bus, PCI-Express bus (PCI-X), and Accelerated Graphics Port (AGP) bus.

Computer system 700 includes one or more processors 712 (or central processing units (CPUs)). A processor 712 may contain a cache 714 for temporary local storage of instructions, data, or computer addresses. Processors 712 are coupled to one or more storage devices, including memory 716. Memory 716 may include RAM 718 and ROM 720. Data and instructions may transfer bi-directionally between processors 712 and RAM 718. Data and instructions may transfer uni-directionally to processors 712 from ROM 720. RAM 718 and ROM 720 may include any suitable computer-readable storage media.

Computer system 700 includes fixed storage 722 coupled bi-directionally to processors 712. Fixed storage 722 may be coupled to processors 712 via storage control unit 707. Fixed storage 722 may provide additional data storage capacity and may include any suitable computer-readable storage media. Fixed storage 722 may store an operating system (OS) 724, one or more executables (EXECs) 726, one or more applications or programs 728, data 730 and the like. Fixed storage 722 is typically a secondary storage medium (such as a hard disk) that is slower than primary storage. In appropriate cases, the information stored by fixed storage 722 may be incorporated as virtual memory into memory 716. In certain embodiments, fixed storage 722 may include network resources, such as one or more storage area networks (SAN) or network-attached storage (NAS).

Processors 712 may be coupled to a variety of interfaces, such as, for example, graphics control 732, video interface 734, input interface 736, output interface 737, and storage interface 738, which in turn may be respectively coupled to appropriate devices. Example input or output devices include, but are not limited to, video displays, track balls, mice, keyboards, microphones, touch-sensitive displays, transducer card readers, magnetic or paper tape readers, tablets, styli, voice or handwriting recognizers, biometrics readers, or computer systems. Network interface 740 may couple processors 712 to another computer system or to network 742. Network interface 740 may include wired, wireless, or any combination of wired and wireless components. Such components may include wired network cards, wireless network cards, radios, antennas, cables, or any other appropriate components. With network interface 740, processors 712 may receive or send information from or to network 742 in the course of performing steps of certain embodiments. Certain embodiments may execute solely on processors 712. Certain embodiments may execute on processors 712 and on one or more remote processors operating together.

In a network environment, where computer system 700 is connected to network 742, computer system 700 may communicate with other devices connected to network 742. Computer system 700 may communicate with network 742 via network interface 740. For example, computer system 700 may receive information (such as a request or a response from another device) from network 742 in the form of one or more incoming packets at network interface 740 and memory 716 may store the incoming packets for subsequent processing. Computer system 700 may send information (such as a request or a response to another device) to network 742 in the form of one or more outgoing packets from network interface 740, which memory 716 may store prior to being sent. Processors 712 may access an incoming or outgoing packet in memory 716 to process it, according to particular needs.

Certain embodiments involve one or more computer-storage products that include one or more tangible, computer-readable storage media that embody software for performing one or more steps of one or more processes described or illustrated herein. In certain embodiments, one or more portions of the media, the software, or both may be designed and manufactured specifically to perform one or more steps of one or more processes described or illustrated herein. Additionally or alternatively, one or more portions of the media, the software, or both may be generally available without design or manufacture specific to processes described or illustrated herein. Example computer-readable storage media include, but are not limited to, CDs (such as CD-ROMs), FPGAs, floppy disks, optical disks, hard disks, holographic storage devices, ICs (such as ASICs), magnetic tape, caches, PLDs, RAM devices, ROM devices, semiconductor memory devices, and other suitable computer-readable storage media. In certain embodiments, software may be machine code which a compiler may generate or one or more files containing higher-level code which a computer may execute using an interpreter.

As an example and not by way of limitation, memory 716 may include one or more tangible, computer-readable storage media embodying software and computer system 700 may provide particular functionality described or illustrated herein as a result of processors 712 executing the software. Memory 716 may store and processors 712 may execute the software. Memory 716 may read the software from the computer-readable storage media in mass storage device 716 embodying the software or from one or more other sources via network interface 740. When executing the software, processors 712 may perform one or more steps of one or more processes described or illustrated herein, which may include defining one or more data structures for storage in memory 716 and modifying one or more of the data structures as directed by one or more portions the software, according to particular needs.

In certain embodiments, the described processing and memory elements (such as processors 712 and memory 716) may be distributed across multiple devices such that the operations performed utilizing these elements may also be distributed across multiple devices. For example, software operated utilizing these elements may be run across multiple computers that contain these processing and memory elements. Other variations aside from the stated example are contemplated involving the use of distributed computing.

In addition or as an alternative, computer system 700 may provide particular functionality described or illustrated herein as a result of logic hardwired or otherwise embodied in a circuit, which may operate in place of or together with software to perform one or more steps of one or more processes described or illustrated herein. The present disclosure encompasses any suitable combination of hardware and software, according to particular needs Although the present disclosure includes several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. A system, comprising:
  a delivery application executing on a processor of a delivery device, the application operable to communicate a message indicating a problem associated with locating a destination site for a user;
  a user application executing on a processor of a user device, the user application operable to:

communicate a message confirming that the user device is located at the destination site; and communicate geocoordinates of the destination site; and a vendor server communicatively coupled to the processor of the delivery device and the processor of the user device, the vendor server operable to:

communicate with the user application to receive the geocoordinates of the destination site; and communicate the geocoordinates of the destination site to the delivery application.

2. The system of claim 1, wherein the delivery device is associated with a deliverer attempting to make a delivery to the destination site.

3. The system of claim 1, wherein the vendor server is further operable to determine a route based at least in part on the geocoordinates of the destination site and communicate the route to the delivery application.

4. The system of claim 1, wherein the vendor server stores an order for the user specifying an address of the destination site, the order comprising a purchase transaction involving a product to be delivered to the destination site.

5. The system of claim 4, wherein the order was executed on a website for a vendor associated with the vendor server.

6. The system of claim 1, wherein the problem associated with locating the destination site comprises at least one of an incomplete address, an unmarked street, an invalid address, and an ambiguous address.

7. A method for associating geocoordinates of a location with an address of the location, using a processor:

receiving, by the processor, notice of a problem with finding a location that is associated with an address;

requesting geocoordinates for the location from a user device associated with the address;

receiving the geocoordinates associated with the location; and communicating the geocoordinates of the location to a transporter device.

8. The method of claim 7, further comprising confirming that the user device is located at the location prior to requesting geocoordinates for the location.

9. The method of claim 7, further comprising communicating a link associated with a website through which the geocoordinates can be provided.

10. The method of claim 7, wherein the geocoordinates comprise a latitude measurement and a longitude measurement.

11. The method of claim 7, further comprising determining a route based at least in part on the geocoordinates.

12. The method of claim 7, further comprising storing the geocoordinates of the location in a memory in association with the address of the location.

13. The method of claim 7, further comprising:

storing geocoordinates for a plurality of addresses in a memory;

determining whether the geocoordinates for the problem location are stored in the memory.

14. The method of claim 7, further comprising:

storing geocoordinates for a plurality of addresses in a memory;

determining that the address of the problem location is different from but associated with at least one of the addresses stored in the memory; and determining the geocoordinates for the problem location using geocoordinates for at least one of the addresses stored in the memory.

15. An apparatus, comprising:

a memory operable to store contact information of a user device; and a processor communicatively coupled to the memory and operable to:

receive a first message indicating a problem associated with locating a destination site associated with the user device;

communicate, to the user device according to the stored contact information, a request for the geocoordinates of the destination site;

confirm that the user device is located proximate the destination site;

receive the geocoordinates of the destination site; and communicate to a transporter device a second message comprising the geocoordinates of the destination site.

16. The apparatus of claim 15, wherein a transporter associated with the transporter device is attempting to travel to the destination site and the transporter device communicates the first message associated with the problem locating the destination site.

17. The apparatus of claim 15, wherein the request can be forwarded to another device through which the geocoordinates of the destination site can be received.

18. The apparatus of claim 15, wherein the request comprises a link corresponding to a website, and the geocoordinates of the destination site can be received through the website.

19. The apparatus of claim 15, wherein the request comprises a message communicated via an application running on the user device.

20. The apparatus of claim 15, wherein the geocoordinates are based at least in part upon a location of a wireless network associated with the destination site.

* * * * *